(No Model.)
J. B. VUNCANON.
CUTTER HEAD AND KNIFE.
No. 588,041. Patented Aug. 10, 1897.
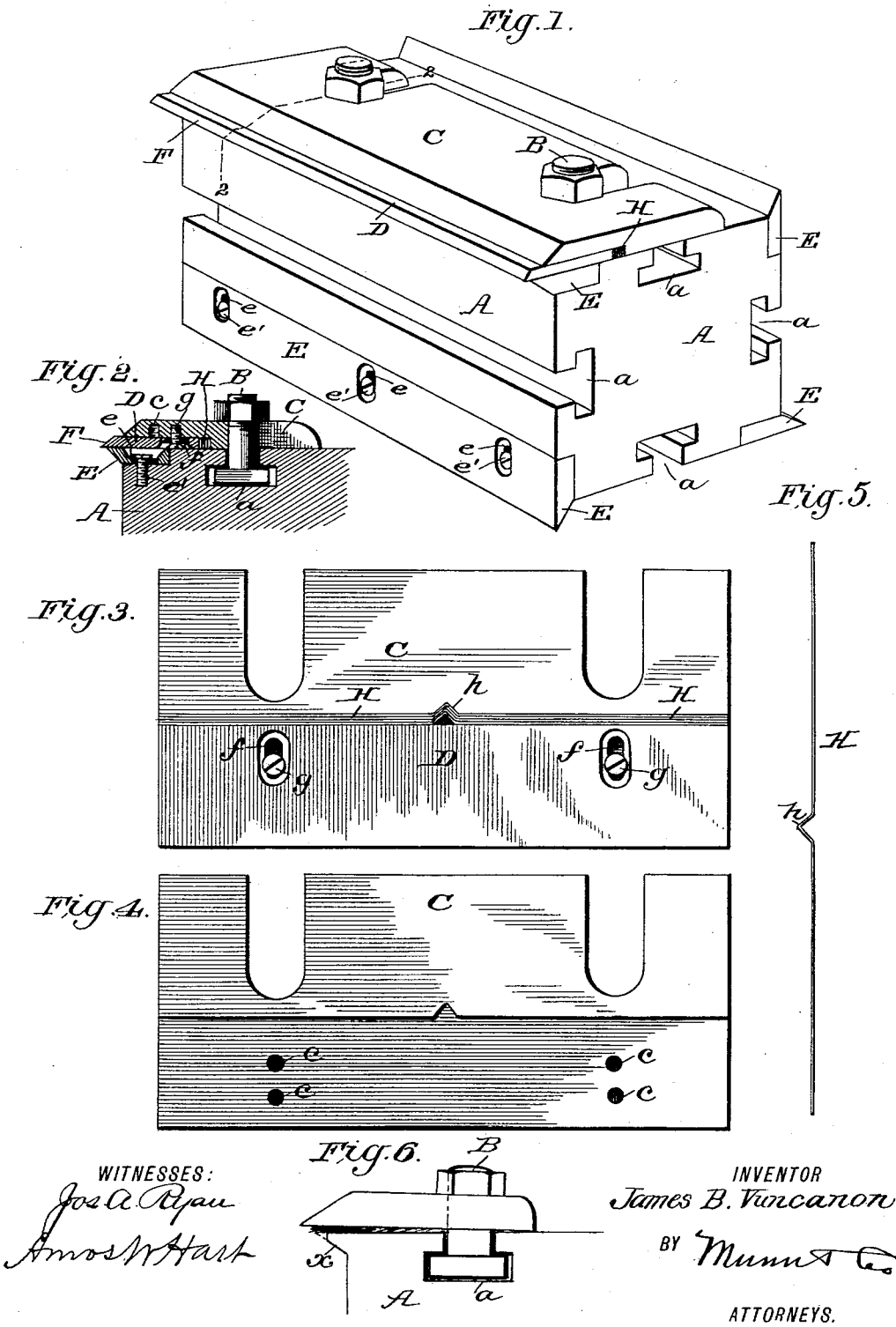
WITNESSES:
Jos. A. Ryan
Amos W. Hart
INVENTOR
James B. Vuncanon
BY Munn & Co.
ATTORNEYS.

UNITED STATES PATENT OFFICE.

JAMES B. VUNCANON, OF ASHEBOROUGH, NORTH CAROLINA.

CUTTER-HEAD AND KNIFE.

SPECIFICATION forming part of Letters Patent No. 588,041, dated August 10, 1897.

Application filed March 17, 1897. Serial No. 628,011. (No model.)

*To all whom it may concern:*

Be it known that I, JAMES B. VUNCANON, of Asheborough, in the county of Randolph and State of North Carolina, have invented a new and useful Improvement in Cutter-Heads and Knives, of which the following is a specification.

The objects of my invention are to increase the efficiency and durability of rotary cutter-heads used for surface planing and molding machines, also to provide an improvement in the adjustment of the knives of the same.

To these ends I have adopted the construction and combination of parts hereinafter described, and shown in accompanying drawings, in which—

Figure 1 is a perspective view of a cutter-head, showing my improvements. Fig. 2 is a cross-section of a portion of the cutter-head on line 2 2, Fig. 1. Fig. 3 is an under side view of one of the knives or cutters and the clamping-plate to which it is adjustably secured. Fig. 4 is an under side view of one of the knife-clamping plates. Fig. 5 is a side view of one of the filling pieces or strips that form an adjustable but firm backing for the knives. Fig. 6 illustrates an old construction of cutter-head.

The stock A of the rotary cutter-head is rectangular and provided with a lengthwise undercut groove $a$ in each of its flat sides to receive the heads of screw-bolts B, by which the beveled and slotted plates C, that hold or clamp the knives D, are held in place and adapted for adjustment toward or from the adjacent edge or angle of the stock A. As usually constructed heretofore the latter has been provided, as shown in Fig. 6, with an integral beveled lip or projection at each such angle, which lip served as a chip-breaker for a knife or cutter. Said lips are the only portions of the stock A subject to appreciable wear, and hence become blunted and dull by use, as shown by dotted lines in said Fig. 6, so that chips or shavings removed by the knives wedge between the latter and the lips, thus tending to throw the knives off, as well as impairing the perfect action of the cutter-head on the lumber. In order to bevel or sharpen the lip $x$ when dull, the stock A must be removed from its shaft and planed in an iron lathe or planer. Aside from the delay and expense incident to this the lips are necessarily reduced in length at each operation until by repeated planings they become too short to be longer useful. To avoid these objections, I have devised a lip E, Figs. 1 and 2, which is removable and also adjustable, so that it may always support the knife at the same point and in the same manner—that is to say, the lip E is formed of a narrow beveled steel cutter, having transverse slots $e$ to receive machine-screws $e'$, that secure it in the rabbet formed in the stock A flush with the adjacent plane surface of the latter. It is obvious that when worn the lip E may be readily detached for grinding, and, since no other portion of the stock is subject to wear, it may be used indefinitely, whereas the ordinary cutter-head must be replaced by a new one when its integral lips have become worn or cut away.

My improvements in respect to the knives proper, F, and their adjustment are as follows: The knife holding or clamping plates C are provided with a rabbet to accommodate the knife F, and in such rabbeted portion there are two or more series of screw-threaded sockets or holes $c$, which are arranged in parallel lines transversely of said plate. The knife F is provided with transverse closed slots $f$ to receive screws $g$, whereby it is secured to the plate C, the said screws being adapted to fit in any of the holes $c$. The knives F are made of such width that when first inserted in place they occupy the entire rabbet, but when worn and ground they require to be adjusted forward or outward, which is permitted by their slots $f$ without changing the position of the screws $g$; but after repeated grindings the knife becomes so narrow that the slots no longer permit it to be set forward in due position for work, and in such case the screws $g$ are changed from the rear holes $c$ to the forward holes, and thereafter the required adjustment of the knives is permitted by the slots, as before, and can be effected by merely loosening the screws in their sockets. By this construction and combination of parts the knives are at all times rigidly secured to the clamping-plates C and yet adapted for fine adjustment until worn out, while the position of said plates relative to the angles of the stock A remains the same, so that they are not subject to change of leverage. The result is that the cutter-head performs better and more rapid work.

In order that the screws $g$ may hold the knife immovable by friction for their heads with the slot edges, they must be screwed in very tightly. As a means for preventing an otherwise possible displacement of the knives by encountering hard or knotty portions of the lumber being planed I employ metal strips or pieces H, Figs. 2 and 5, which are inserted in the space between the back edge of the knives and the shoulder of the rabbet. Thus as the knives are adjusted forward such strips H are inserted so as to fill the space referred to and form a firm backing for the knives. In order to prevent the filling-strips from sliding lengthwise and becoming displaced more or less, I provide them with a central bend or angle $h$ and the shoulder of the rabbet with a corresponding notch, in which the bend fits closely. Since all the strips employed have the same angle, they are adapted to nest or fit together perfectly, as shown.

What I claim is—

1. The combination, with a four-sided cutter-head stock, of knives having transverse slots, the clamping bolts and plates therefor, having rabbets of the same depth as the thickness of said knives, and provided with two transverse rows of alined screw-threaded holes, which are formed in the under side of the rabbeted portions as shown, and the screws $g$ passing through said slots in the knives and countersunk in the same, and adapted to enter any of such holes, whereby the knives are adapted for individual adjustment and also for adjustment together with the screws, as specified.

2. The combination, with the four-sided cutter-head stock, of slotted removable knife-clamping plates, having a rabbet in the under side and screw-holes in such rabbeted portion, slotted removable knives, and screw-bolts passing through the knives, for holding them adjustably, and the fitting strips extending longitudinally parallel to and arranged between the backs of said knives and the shoulders of the rabbets, and having lateral bends that fit together and in a corresponding recess of said shoulders for preventing longitudinal displacement, as specified.

J. B. VUNCANON.

Witnesses:
 AMOS W. HART,
 M. D. BLONDEL.